US006285683B1

(12) United States Patent
Lin (10) Patent No.: US 6,285,683 B1
(45) Date of Patent: Sep. 4, 2001

(54) METHOD AND APPARATUS FOR PROVIDING EXTENDED CAPABILITY TELEPHONE SERVICES VIA AN AUTOMATED SERVER

(75) Inventor: Steve Min-Chou Lin, East Brunswick, NJ (US)

(73) Assignee: Global ADSI Solutions, Inc., Morganville, NJ (US)

( * ) Notice: Subject to any disclaimer, the term of this patent is extended or adjusted under 35 U.S.C. 154(b) by 0 days.

(21) Appl. No.: 08/801,782

(22) Filed: Feb. 14, 1997

(51) Int. Cl.[7] .............................. H04J 3/16; G06F 15/00
(52) U.S. Cl. ......................... 370/466; 707/513; 370/467
(58) Field of Search .................. 379/88.11, 88.12–88.17, 379/93.27, 93.25, 93.09, 93.18, 88–93; 707/500–526; 345/133, 326, 335; 377/88–93; 370/466, 467

(56) References Cited

U.S. PATENT DOCUMENTS

| | | | |
|---|---|---|---|
| 5,761,280 | * | 6/1998 | Noonen et al. ..................... 379/93.27 |
| 5,805,442 | * | 9/1998 | Crater et al. .......................... 364/138 |
| 5,926,756 | * | 7/1999 | Piosenka et al. ..................... 455/418 |
| 5,930,341 | * | 7/1999 | Cardillo, IV et al. ............. 379/93.25 |
| 5,937,041 | * | 8/1999 | Cardillo, IV et al. ............. 379/93.25 |
| 5,961,601 | * | 10/1999 | Lyengar ................................ 709/229 |

OTHER PUBLICATIONS

Bellcore, Generic requirements for an SPCS to customer premises equipment data interface for analog display services, Bell Communications research, pp. 1–1 and 1–3, Dec. 1, 1982.*

"Generic Requirements for an SPCS to Customer Premises Equipment Data Interface for Analog Display Services", Technical Reference TR–NWT–001273, Issue 1, Dec. 1992.

"Customer Premises Equipment Compatibility Considerations for the Analog Display Services Interface", Special Report SR–INS–002461, Issue 1, Dec. 1992.

* cited by examiner

Primary Examiner—Hosain T. Alam
Assistant Examiner—Alford W. Kindred
(74) Attorney, Agent, or Firm—Burns, Doane, Swecker & Mathis, L.L.P.

(57) ABSTRACT

Automated servers can provide a wide-variety of services and information to users via communications vehicles such as telephones. Such servers are often designed to interact specifically with an abstract model of user input/output equipment having well-defined features, such as telephones having text screens and programmable "softkeys". A web interface apparatus adapts communications between server logic and a web browser, wherein data exchanged with the server logic is associated with features of an abstract model of user input/output equipment, and wherein the web browser lacks at least one of the features of the abstract model of the user input/output equipment. In one embodiment, data packets received from the server logic are converted into web pages. In another aspect of the invention, the web interface apparatus itself models some aspects of the abstract model of the user input/output equipment (such as softkeys) which are not otherwise supported by the web browser. This may be performed by having the web interface apparatus store an expected response or service, and by inserting a hyperlink and associated tag into the web page for the purpose of detecting when a user of the web browser has selected the function to be performed by the softkey.

16 Claims, 4 Drawing Sheets

Global Prompt

Enter SSN: [  ] - [  ] - [    ]

Line 1 Primary Column Secondary Column
Line 2 Primary Column Secondary Column
Line 3 Primary Column Secondary Column
Line 4 Primary Column Secondary Column
Line 5 Primary Column Secondary Column
Line 6 Primary Column Secondary Column
Line 7 Primary Column Secondary Column
Line 8 Primary Column Secondary Column Enter Selection: [0]

softkey 1 | softkey 2 | softkey 3 | softkey 4 | softkey 5 | softkey 6

METHOD AND APPARATUS FOR PROVIDING EXTENDED CAPABILITY TELEPHONE SERVICES VIA AN AUTOMATED SERVER

BACKGROUND

The present invention relates to data communications and telecommunications, and more particularly to automated services that may be provided to telephone and computer users via a telephone network.

It is known to provide various types of automated services to telephone users. A user may access such services merely by placing a telephone call to an automated server. Upon establishment of a connection, the automated server may prompt the user with pre-recorded voice messages (e.g., "If you would like to listen to information about traffic conditions, press 3"). The user makes selections by pressing one or more appropriate keys on the telephone, which causes dual tone multi-frequency (DTMF) tones to be transmitted to the automated server. Operation of the automated server is then performed in response to which DTMF tones were received.

Figure 1:
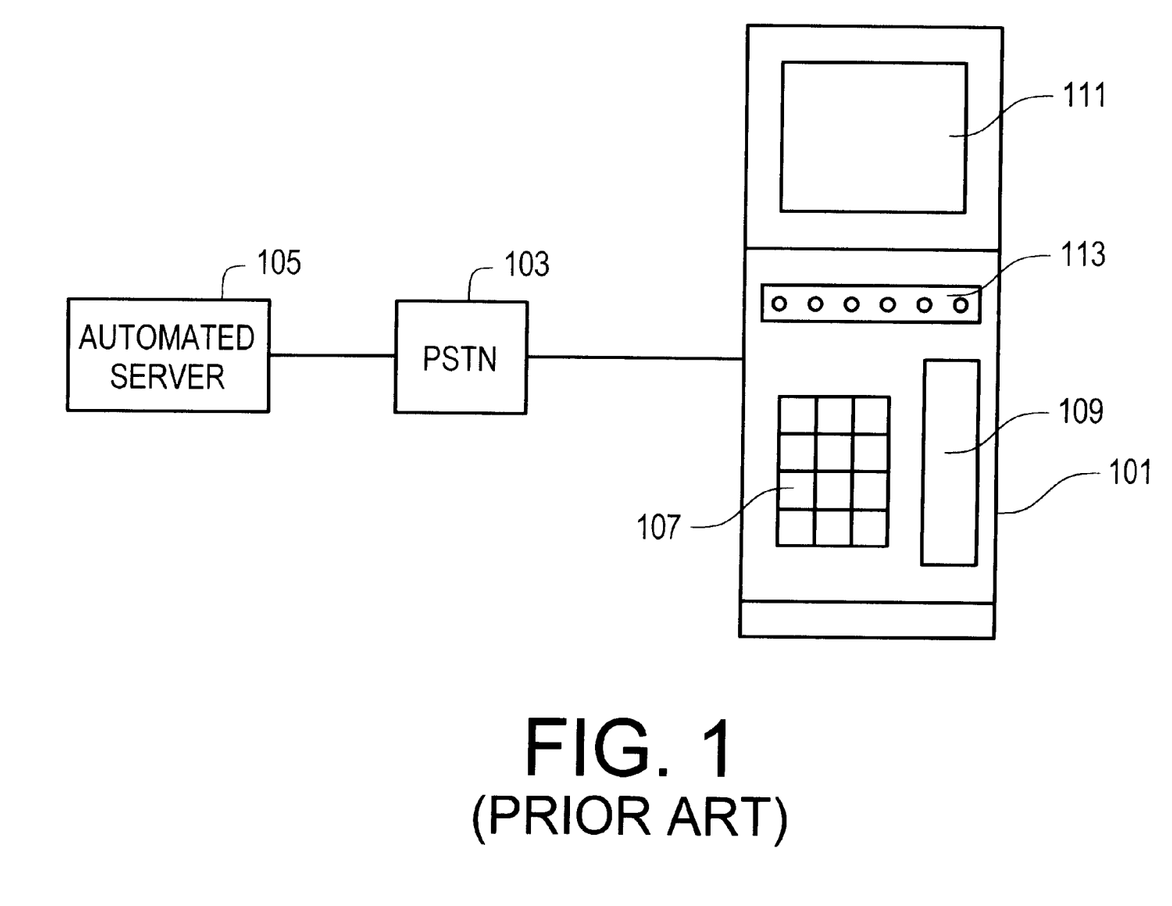
FIG. 1 is a block diagram of a conventional system including an automated server and an expanded capability telephone.

In order to improve the quality and variety of automated services that may be offered, a number of manufacturers now make and sell telephones having expanded input and output capabilities. An example is illustrated in FIG. 1. In this example, an expanded capability telephone 101 is coupled to an automated server 105 by means of a public switched telephone network (PSTN) 103. The automated server may be an application program running on a general purpose digital computer, or alternatively may be a hard-wired (i.e., non-programmable) device.

The expanded capability telephone 101 includes not only a standard numerical keypad 107 and handset 109, but also a screen 111 for displaying visual information, and a number of so-called "softkeys" 113. Information to be displayed on the screen 111 is transmitted from the automated server 105 to the expanded capability telephone 101 via the PSTN 103.

The softkeys 113 are termed that because their function is determined by a program running inside the expanded capability telephone 101. The programs for the softkeys 113 may typically be downloaded from the automated server 105 by means of the PSTN 103. One example of a possible softkey function is to move the position of a selection cursor that is currently being displayed on the screen 111. Another one of the softkeys 113 might be programmed to send a DTMF-encoded message to the automated server 105, indicating the present screen location of a selection cursor (and thereby indicating which of a number of displayed selection possibilities has been selected by the user).

In order for the above-described system to be operational, it is necessary for the automated server 105 and the expanded capability telephone 101 to use a mutually agreed-upon protocol for the transmission of information through the PSTN 103. Where a manufacturer makes both the automated server 105 and the expanded capability telephone 101, the protocol can be defined on an ad hoc basis. However, in order to promote the widespread development of automated services, and to permit automated servers 105 developed by one manufacturer to operate with expanded capability telephones 101 developed and made by a different manufacturer, a standardized protocol is needed. One such standard protocol, called the Analog Display Services Interface (ADSI), has been defined by Bellcore, and described in the following documents which are hereby incorporated by reference herein: Bellcore FR-12 "ADSI Guide", 1994, including: Bellcore TR-NWT-001273, "Generic Requirements for an SPCS to Customer Premises Equipment Data Interface for Analog Display Services"; Bellcore TR-NWT-000030, "Voiceband Data Transmission Interface Generic Requirements"; Bellcore SR-INS-002461, "Customer Premises Equipment Compatibility Considerations for the Analog Display Services Interface"; Bellcore SR-TSV-002476, "Customer Premises Equipment Compatibility Considerations for the Voiceband Data Transmission Interface"; Bellcore SR-TSV-002697, "An Encryption Capability for the Analog Display Services Interface"; Bellcore SR-NWT-002495, "Guidelines for Writing Applications Which Use the ADSI for Data Communications"; Bellcore SR-TSV-002578, "A Method and Apparatus for Detecting a Dual Tone Signal in the Presence of Speech"; Bellcore SR-INS-002726, "Classes of Customer Premises Equipment"; Bellcore SR-NWT-003004, "Testing Guidelines for Analog Type 1, 2 and 3 CPE"; and SR-3034, "ADSI Script Management".

One aspect of the ADSI standard is the definition of the Customer Premises Equipment (CPE), which is an abstract expanded capability telephone having a screen (for displaying a title, information and overwritable user input fields), a keypad, and six softkeys.

The ADSI protocol, then, defines the way voice and data will be communicated over an existing analog telephone network between an automated server 105 and an expanded capability telephone 101 that supports the features and functions that have been defined for the CPE. In addition to real-time interactive applications (using an ADSI capability called "Server Display Control" or SDC), an ADSI capability called "Feature Download" also enables a program to be downloaded from an automated server 105 to the CPE-compatible expanded capability telephone 101. The downloaded program (often referred to as a "script") is run (interpreted) on the expanded capability telephone 101, and remains resident in the expanded capability telephone 101 until it is erased by the user. The Feature Download capability permits a telephone company to download a call management (telephony) script tailored to an individual's service subscription. As a result, the individual can activate services such as three-way calling, call waiting, call forwarding and the like through context sensitive screen prompts and softkeys.

An example of a feature that can be implemented by means of an advanced call management telephony script is a service which, in some regions, is called "Call Waiting Deluxe". Call Waiting Deluxe lets a user know who is calling when call waiting is activated. In addition, a push button allows the user to:

switch to the new call;

add the new call (i.e., conference call);

forward the new call to the user's voice mail;

put the new caller on hold with a hold announcement and music;

play back a busy message telling the new caller to call back later; or     drop the current call and switch to the new call.

As mentioned above, the use of ADSI-based services conventionally requires that the user have an ADSI-capable device. Such devices have been made in the form of screen phones, personal digital assistants (PDAs), pagers, ADSI-capable personal computers (PCs), and even television set-top boxes that permit a call to be made by means of a television set. A consequence of the conventional approach to the provision of ADSI-based services is that users who do not own the above-mentioned specialized equipment are unable to take advantage of the benefits that such services provide. This also means that the customer-base for the providers of such services is undesirably restricted.

SUMMARY

It is therefore an object of the present invention to provide a mechanism for supplying expanded telephone-based services to users who are not using a specially made expanded telephone.

It is a further object of the present invention to provide a mechanism for supplying ADSI-based services to users who do not possess ADSI-compatible equipment.

The foregoing and other objects are achieved in a web interface method and apparatus for enabling communications between server logic means and a web browser, wherein data exchanged with the server logic means is associated with features of an abstract model of user input/output equipment, and wherein the web browser lacks at least one of the features of the abstract model of user input/output equipment. According to one aspect of the invention, the web interface receives a first data packet from the server logic means, and generates a web page based on information contained in the first data packet, wherein the web page is for transmission to the web browser.

In another aspect of the invention, the abstract model of user input/output equipment includes a programmable softkey; the web browser lacks the programmable softkey; and the step of generating the web page comprises the steps of: detecting a softkey program in the first data packet, wherein the softkey program is directed at the programmable softkey. The web interface then models the programmable softkey, and generates the web page based on information contained in the first data packet and on the model of the programmable softkey, wherein the generated web page includes means, associated with a portion of the web page, for detecting selection, by a user of the web browser, of the portion of the web page.

In another aspect of the invention, the step of modelling the programmable softkey comprises storing a sequence of characters contained in the first data packet; the portion of the generated web page includes an icon representing the programmable softkey; and the means, associated with the portion of the web page, for detecting selection, by a user of the web browser, of the portion of the web page is a hyperlink.

In still another aspect of the invention, the web interface further receives a web page response from the web browser; and generates a second data packet based on information contained in the web page response, wherein the second data packet is for transmission to the server logic means.

In yet another aspect of the invention, the hyperlink includes a tag; and the web interface further receives a web page response from the web browser; detects the tag in the web page response; and generates, in response to detection of the tag in the web page response, a second data packet for transmission to the server logic means, wherein the second data packet includes the stored sequence of characters.

In still another aspect of the invention, the step of modelling the programmable softkey comprises the step of associating a screen line number with a tag. Also, the portion of the generated web page corresponds to the screen line number; and the means, associated with the portion of the web page, for detecting selection, by a user of the web browser, of the portion of the web page is a hyperlink that includes the tag.

In yet another aspect of the invention, the web interface further receives a web page response from the web browser; detects the tag in the web page response; and generates, in response to detection of the tag in the web page response, a second data packet that includes the screen line number associated with the tag, wherein the second data packet is for transmission to the server logic means.

In another aspect of the invention, the step of generating the second data packet comprises the steps of: detecting a state value in the web page response; comparing the detected state value with an expected state value; and generating, in response to the detected state value matching the expected state value, the second data packet based on information contained in the web page response, wherein the second data packet is for transmission to the server logic means.

BRIEF DESCRIPTION OF THE DRAWINGS

The objects and advantages of the invention will be understood by reading the following detailed description in conjunction with the drawings in which.

DETAILED DESCRIPTION

The various features of the invention will now be described with respect to the figures, in which like parts are identified with the same reference characters.

The invention makes it possible for an automated server to provide its services to a user who may alternatively be using an expanded capability telephone 107 (or equivalent specialized equipment) and/or a general purpose digital computer that is coupled to a network provider. The invention will be described with respect to an exemplary embodiment that is depicted in FIG. 2.

Figure 2:
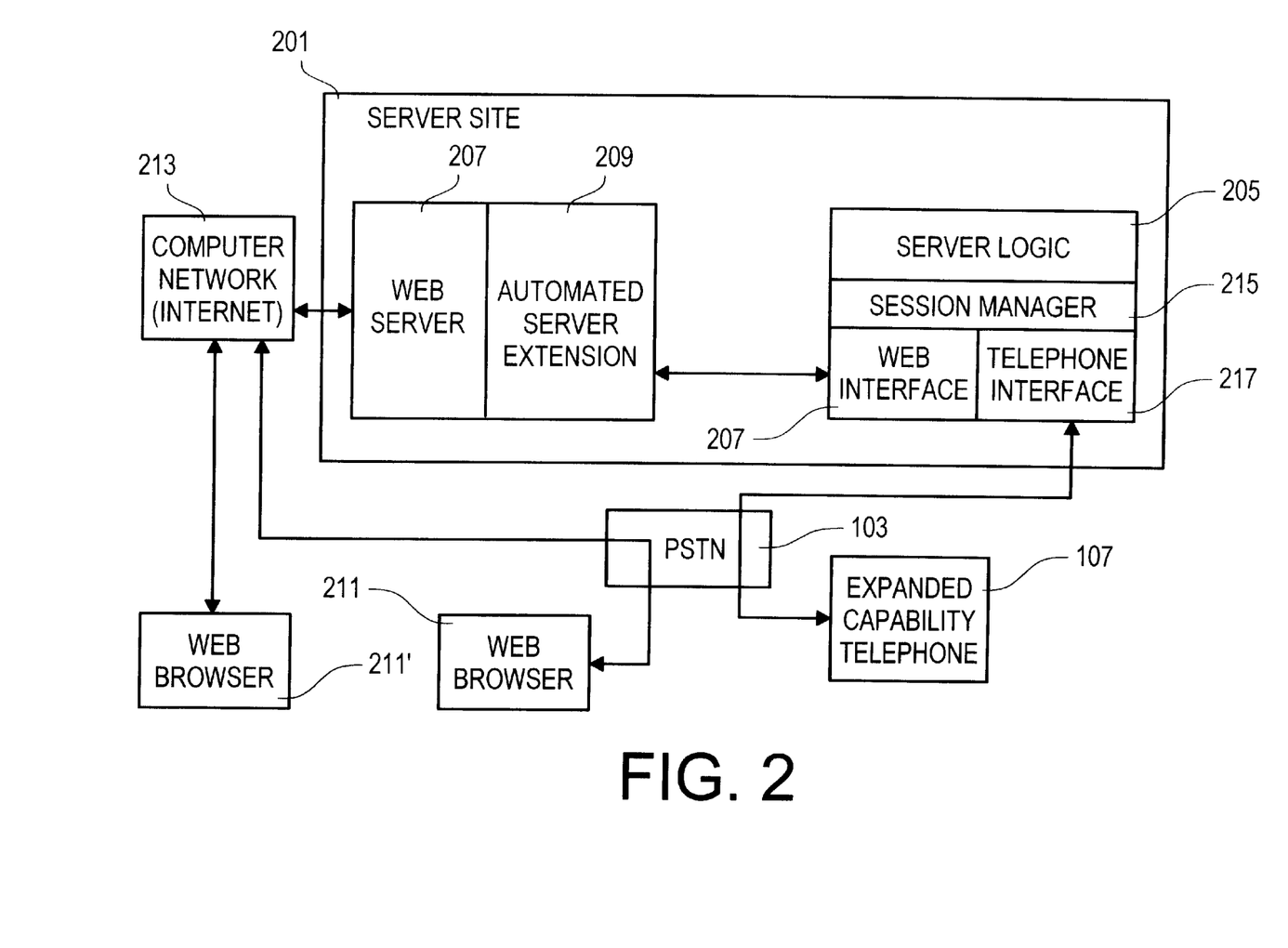
FIG. 2 is a block diagram of an exemplary embodiment of the invention.

Referring now to FIG. 2, a server site 201 is generally accessible to telephone users by means of a PSTN 103. The server site 201 includes server logic means 205 for exchanging information with a user and for providing application-dependent services. In a preferred embodiment, the server logic means 205 is an application program running as a process under the WINDOWS NT operating system, which is itself running on a general purpose digital computer. Of course, the selection of this particular operating system is not essential to the invention, which could easily be implemented on other operating systems as well, such as UNIX.

An expanded capability telephone 107 may access the automated server 205 by establishing a connection through the PSTN 103. A telephone interface 217 and a session manager are disposed between the server logic means 205 and the PSTN 103. The telephone interface 217 translates the expanded capability telephone's 107 DTMF signals into usable data for the server logic means 205. The telephone interface 217 also detects the various network signals (e.g., hook status, caller ID), and converts these into appropriate events and/or information for use by the server logic means 205. As its name indicates, the session manager 215 performs session management functions. The session manager 215 will be described in greater detail below.

In a preferred embodiment, the expanded capability telephone 107 is ADSI-capable equipment, and the server logic means 205 is designed to operate in accordance with the ADSI protocol. In part, this means that the server logic means 205 is designed to interact with the abstract CPE specified by the ADSI standard. For example, the server logic means 205 may assume that it is communicating with equipment that includes six softkeys 113. As a consequence, the server logic means 205 may program one or more of the softkeys 113 to perform such actions as moving a cursor on the screen 111, returning a current line number indicated by a screen cursor, or returning a predefined sequence of alpha-numeric characters (e.g., "ABCD") whenever that softkey 113 is activated by the user. Techniques for making and using ADSI servers for operation with ADSI-capable equipment are known, and will not be discussed here further.

In accordance with one aspect of the invention, the server site 201 further includes a web server 203 which is accessible to a web browser 211 through a computer network 213. The web browser 211 may access the computer network 213 through the PSTN 103. Alternatively, a web browser 211 ' may have direct access to the computer network 213, as illustrated. The web browser 211 may be a general purpose digital computer that is executing a program for coupling to a computer network. Like the automated server 205, the web server 203 is preferably an application program running as a process under the WINDOWS NT operating system, which is itself running on a general purpose digital computer. In a preferred embodiment, both the web server 203 and the web browser 211 are adapted for operation with a computer network such as the Internet. A user of the web browser 211 may view network-supplied information in the form of so-called web pages, which are display images that have been built by means of the HyperText Markup Language (HTML), which is well-known in the art. The use of HTML is not essential to the invention, however, since other programming languages such as JAVA could also be used for building the web pages. A web page built in this manner may include so-called hypertext links, which will return application-defined tag values whenever a user utilizes a pointing device (e.g., a "mouse") to point to a particular area of the screen image and activate a switch associated with the pointing device. (This activity is commonly referred to as "clicking" on a particular item.) The web server 203 may analyze the returned tags in order to determine what action it should take next.

In accordance with another aspect of the invention, the web server 203 is coupled to (or may alternatively include) an automated server extension 209. Furthermore a web interface 207 is provided for the purpose of adapting communications between the web server 203 (via the automated server extension 209) and the server logic means 205. In a preferred embodiment, the web interface 207 runs under the same process as the server logic means 205, although this is not essential. Also in a preferred embodiment, the automated server extension 209 and the web interface 207 communicate with one another by means of the operating system's Inter-Process Communication (IPC) mechanism. Working together, the automated server extension 209 and the web interface 207 provide a means for enabling the web browser 211 to access and utilize the automated server 205. In order to accommodate the fact that the web browser 211 does not have all of the expanded capability telephone features (e.g., softkeys 113) that may be referenced and utilized by the server logic 205, the web interface 207 adapts the information contained in the server logic's output data packets (e.g., data packets that are appropriate for an ADSI interface) into information that is to be displayed on a web browser 211 as a corresponding web page. The web page may additionally include hypertext links, as will be described in greater detail below. Looking in the other direction, a web page response is received from the web browser 211 by the web server 203, communicated to the web interface 207 by the automated server extension 209, and adapted into a corresponding server logic data packet (e.g., a data packet that is appropriate for an ADSI interface) before being processed by the server logic means 205. In this way, the commonly accessed server logic means 205 can provide the same services to the web browser 211 as are provided to the expanded capability telephone 107. Each web page is preferably built with the HyperText Markup Language (HTML).

In another aspect of the invention, the adaptation process performed by the web interface 207 is more than mere movement of data from, say, an output data packet into a web page, and vice versa. This is because some of the capabilities that are normally supported within the expanded capability telephone 107 cannot be supported by the web browser 211. Consequently, the web interface 207 itself must provide this support. In particular, the web interface 207 should include the following capabilities:

1) Because the server logic means 205 is designed for operation with an expanded capability telephone 107, it expects to receive and transmit characters in an ADSI encoded DTMF format. The web browser 211, however, is designed to handle a different format, such as ASCII characters. Consequently, the web interface 207 needs to convert from one character format to another (e.g., from ASCII characters received in an incoming web page to ADSI encoded DTMF format characters to be inserted into inbound server logic data packets).

2) Operation of the server logic means 205 is typically initiated by an incoming call event. Once a call is established, the server logic means 205 maintains an ongoing session with that particular caller. By contrast, each web page transmission from the web browser 211 to the web server 203 establishes a new socket connection with the web server 203. The socket connection is used merely to communicate the one web page, and is not maintained over any session with this particular web browser 211. In order to accommodate this difference, the initial click on the web browser 211 for the purpose of connecting to an ADSI application needs to be detected by the web server 203, and translated into an incoming call event to be passed on to the server logic means 205. The web interface 207 is preferably able to detect a user's request for initial connection to the server logic means 205 by examining the status of channel and state data fields that are hidden in the web page in accordance with another aspect of the invention. These fields are described in greater detail below.

The server logic data packets (both inbound and outbound) may include information pertaining to one or more of the softkeys 113. Because, in the exemplary embodiment, the web browser 211 is not capable of supporting programmable keys, this function should be performed by the web interface 207. The special adaptation steps include the following:

3) The server logic means 205 has the capability of programming one or more of the softkeys 113 to store a sequence of one or more DTMF digits, and to transmit this sequence back to the server logic means 205 whenever the corresponding softkey 113 is activated. To provide this feature to the user of the web browser 211, the web interface 207 should examine each of the server logic means' output data packets and identify any such softkey programming. When this type of programming is found, the web interface 207 should store the sequence of DTMF digits, and format a web page that will include an icon representing the softkey 113. When, for example, the web page is built by means of HTML, the softkey icon should be associated with a hyperlink. When the user clicks on the softkey icon, a tag for this hyperlink is transmitted back to the web server in a web page response (e.g., an HTTP Request) and forwarded (by means of the automated server extension 209) to the web interface 207. In response, the web interface 207 generates an incoming server logic means data packet that includes the DTMF sequence that has been stored for this softkey 113.

4) The server logic means 205 also has the capability of programming one or more of the softkeys 113 to return a line number associated with a cursor position on the screen 111. To support this feature, the web interface 207 should examine each of the server logic means' output data packets and identify any such softkey programming. When this programming is found, the web interface 207 should generate a web page having lines that are associated with unique tags that are transmitted back to the web server 203 whenever the user clicks on the corresponding lines. In a preferred embodiment, this is done by inserting a corresponding hyperlink for each line in the HTML display image. Regarding this aspect of the invention, it is preferable that the generated web page not include an icon for the corresponding softkey 113, because HTML does not provide any mechanism for reporting a cursor location that is different from the location of the softkey icon. Furthermore, even if another language is capable of building a web page that can support this feature, it is expected that a user of the web browser 211 will find it more convenient to click on the actual line itself rather than first moving a cursor to the desired line and then clicking on a softkey icon.

Looking at communications in the other direction now, when a user clicks on one of these lines, a unique tag associated with the hyperlink is included in a web page response (e.g., an HTTP Request) and transmitted to the web interface 207 by way of the web server 203 and automated server extension 209. The web interface 207 then determines the line number associated with the unique tag, generates an inbound server logic data packet containing this line number, and passes the generated server logic data packet to the server logic means 205.

The web interface 207 may additionally adapt other features of the abstract CPE. For example, an outbound server logic data packet may specify that some portion of the information to be displayed should be highlighted (e.g., by using different screen colors and/or fonts). In order to support this feature, the web interface 207 should include corresponding highlighting in the generated web page that is to be communicated to the web browser 211.

Also, the web interface 207 may handle a Communication page of the ADSI protocol in accordance with the following: When the server logic means 205 sends both the Information and Communications pages as defined by ADSI, the web interface 207 should buffer the Communications page and send only a first ADSI HTML (or JAVA) page that contains the Information page. The first ADSI HTML page should also include an icon of a softkey 113, associated with a hyperlink having a corresponding tag. The softkey icon allows the user to indicate when the Communications page should be sent. When the user clicks on the softkey 113 and the web interface 207 subsequently identifies the received tag, the web interface 207 should respond by sending to the web browser 211 a second ADSI HTML (or JAVA) page having encoded therein the Communications page. Note that in this case, the state value encoded in the second ADSI HTML page should be the same as that which was encoded in the first ADSI HTML page because this corresponds to a local function of the expanded capability telephone 107.

Furthermore, the web interface 207 may further analyze outbound data packets from the server logic 205 in order to detect references to softkeys 113 whose respective functions relate only to local functions of the expanded capability telephone 107, which functions are not modelled within the web interface 207 itself. If such softkeys 113 are detected, the generated ADSI HTML (or JAVA) web page should not include an icon for these softkeys 113.

In yet another aspect of the invention, the format of the text to be displayed on the expanded capability telephone 107 is different from the format of corresponding text to be displayed on the web browser 211. For example, the web browser 211 may be capable of displaying more intricate graphics than can be displayed on the screen 111 of the expanded capability telephone 107. To accommodate this difference, one job of the session manager 215 is to detect the destination of the display data (i.e., web browser 211 versus expanded capability telephone 107) and to transmit display data that is formatted for the appropriate destination.

In still another aspect of the invention, the outbound voice channel that is normally associated with the expanded capability telephone 107 is mapped in some fashion. In a simplest embodiment, a voice/sound file that would be played to the expanded capability telephone 107 is simply ignored when the user is a web browser 211. The session manager may be used to distinguish between call types, and to make the decision whether or not to play the voice/sound file designated by the server logic 205.

In an alternative embodiment, a text file can be substituted for the voice/sound file when the output is to go to a web browser 211 instead of to an expanded capability telephone. Again, the session manager 215 may be adapted to determine the equipment-type at the destination, and to select the appropriate action accordingly.

To provide a full multimedia capability at the web browser 211, an appropriately encoded sound file can be communicated to the web browser 211 whenever the server logic 205 designates a voice/sound file to be output to the user. Once again, the session manager 215 may select the appropriate file and action in response to the type of equipment being used at the destination.

Other functions of the session manager 215 are not relevant to an understanding of the invention, and are not described here.

Figure 3:
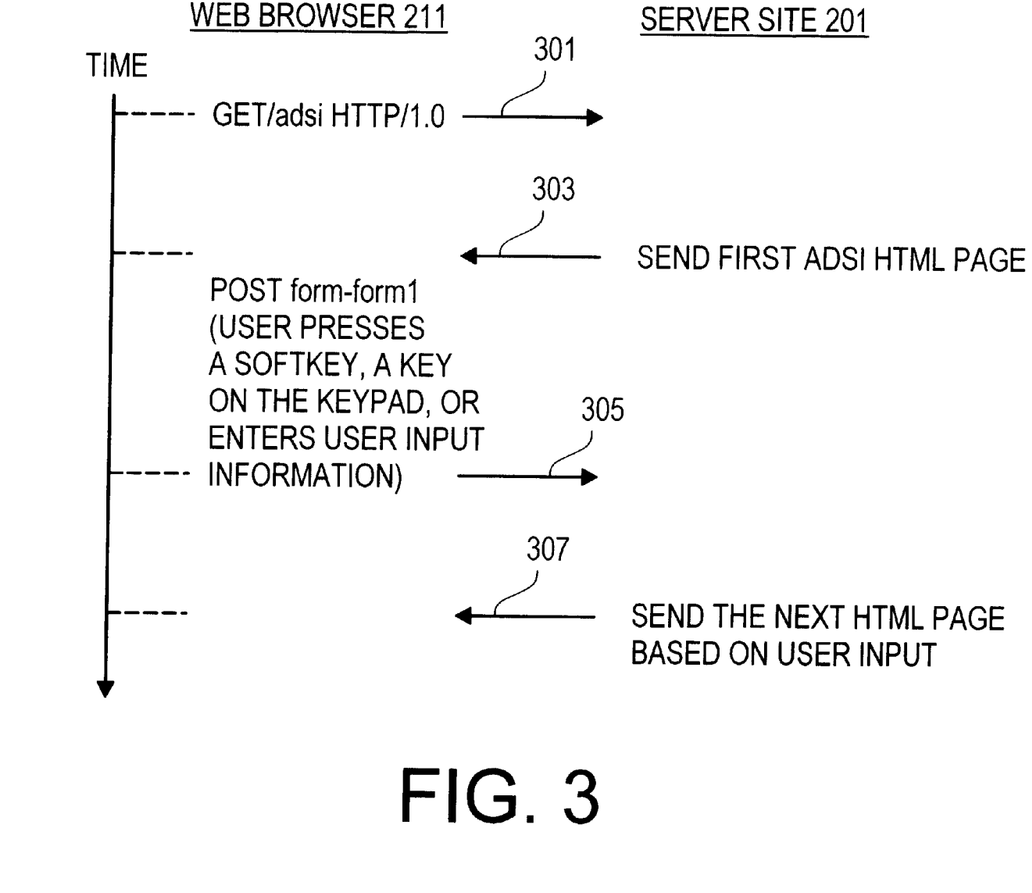
FIG. 3 illustrates a sequence of interactions between a web browser and a server site in accordance with one aspect of the invention.

FIG. 3 illustrates a sequence of interactions between the web browser 211 and the server site 201 in accordance with an exemplary embodiment of the invention. At step 301, the web browser 211 establishes a connection with the server site 201 by sending the message "GET /adsi HTTP/1.0" to the web server 203. The message is forwarded by the automated server extension 209 to the web interface 207, converted into a data packet that is appropriate for an ADSI interface indicating an incoming call event, and forwarded (through the session manager 215) to the server logic means 205. The server logic means 205 prepares a responding outbound data packet in accordance with application-dependent and ADSI specifications. The web interface 207 adapts the outbound data packet into an HTML page in accordance with the principles described above, forwards the HTML page to the automated server extension 209 (by means of the IPC mechanism), and then further forwards (step 303) the HTML page to the web browser 211, where it is displayed as a web page to the user. The user may respond by using a pointer device to point to various icons on the web page and then pressing a button on the pointer device. Alternatively, the user may respond by pressing one or more keys on his computer keypad, or by using his computer keyboard to enter user input information followed by the ENTER key. This causes a web page response in the form of the message "POST form=form1" to be sent to the web server 203. This message is then forwarded by the automated server extension 209 to the web interface 207, converted into an inbound data packet in accordance with principles described above, and passed through the session manager 215 up to the server logic means 205. The server logic means 205 generates an application-specific response in the form of an outbound data packet. This data packet is then adapted into a next ADSI HTML page by the web interface 207 in accordance with principles described above, forwarded to the automated server extension 209 (by means of the IPC mechanism), and then further forwarded (step 307) to the web browser 211, where it is displayed to the user as a next web page.

This process continues until the ongoing session is terminated either by the server logic 205 or by the user of the web browser 211.

Another aspect of the invention concerns the fact that the protocol for communicating web pages (e.g., the HTTP protocol) as well as the web pages themselves, do not maintain or utilize state information. That is, each transmission of a web page is treated as a new socket connection by the web server 203. By contrast, however, automated servers (e.g., ADSI applications) often need to maintain and utilize state information as well as a channel identifier associated with each user. Although expanded capability telephones 107 also fail to maintain or utilize state information, this is not a problem because it is sufficient that the automated server maintain its own state information; the expanded capability telephone 107 has no capability for providing any response that does not correspond to the current state of the server logic means 205. This is not the case with a web browser 211, however, because it provides the capability for its user to scroll through any of a number of stored web pages. As a result, it is possible that a user might page back to a previously received web page (corresponding to a non-current state of the server logic means 205) and send an inappropriate web page response back to the web server 203.

To accommodate this difference, the invention utilizes a hidden part of the web page itself to store a channel identifier (channel ID) and a state value. In a preferred embodiment, this is done by incorporating an "Input" element of the HTML page into each ADSI HTML page. The hidden input element is sent back by the web browser 211 in each web page response (e.g., HTTP Request). The web interface 207 is then able to retrieve the channel ID and the state value from the HTML Request, and compare these to an expected state value for this channel ID in order to determine whether an inappropriate response has been received. If the state value is not what was expected for this channel ID, the web interface 207 does not send anything to the server logic means 205. Instead, the web interface 207 may respond by resending back to the web browser 211 the web page corresponding to the proper state.

If the received state value matches what was expected, then the appropriate data packet can be generated and passed on for use by the server logic means 205. When the server logic means returns another data packet, the channel ID and new state value are then hidden in the next HTML page that is sent to the web browser 211. In other words, each web page is used as a storage medium for maintaining channel ID and state values for each ongoing session with a user of the web browser 211.

As described above, the automated server extension 209 and web interface 207 exchange data with one another. A preferred format for data being passed from the automated server extension 209 to the web interface 207 is shown in Table 1

TABLE 1

| Field Type | Field Length (bytes) | Remarks |
| --- | --- | --- |
| Channel ID | 1 | This is the channel ID that is returned from the HTML hidden Input field. If the Method field is "GET" and the data field contains "/adsi/app_name", then this indicates that this is a new connection. |
| HTTP Method | 1 | Values are GET or POST |
| Data Length | 2 | The length of the data |
| Data | n | Data is contained in this field. |

A preferred format for data being passed from the web interface 207 to the automated server extension 209 is shown in Table 2.

TABLE 2

| Field Type | Field Length (bytes) | Remarks |
| --- | --- | --- |
| Channel ID | 1 | This is the channel ID that is returned from the GET/POST method. |
| Content-Type | 1 | A value of 0 indicates Text. A value of 1 indicates that the content is Text/Image. |
| Data Length | 2 | The length of the data |
| Data | n | Data is contained in this field. |

The discussion will now focus on an embodiment in which the server logic means 205 is an ADSI server, and the web page is an HTML page. As mentioned above, the ADSI protocol defines an abstract CPE that contains a screen (comprising a title and information), a keypad, input formats (user input) and six softkeys. Therefore, the HTML page should be formatted according to the abstract CPE model, as in the following examples:

Title

In ADSI, when the flag of INAL in the INFORMATION parameter is set, the screen phone must show the global prompt (title). To format this, an ADSI HTML page should contain the following section:
<title>
Global Prompt
</title>

Of course, the above example may be embellished by adding additional code to improve the appearance of the title on the screen (e.g., by using a larger font size).

Information Display

The ADSI protocol allows a screen phone to send back the current Line Number of an active line. Therefore, the format of an ADSI HTML page should be dependent on whether this feature is turned ON or OFF (i.e., by whether any softkeys have been programmed by the server logic means 205 to return a current line number). If the feature is turned OFF, the HTML page should contain pure text information without any hyperlinks. The following is an example of an HTML page that models an ADSI screen that does not include any capability for allowing the screen phone to send back a selected Line Number:

Line 1 Primary Column Secondary Column
Line 2 Primary Column Secondary Column
Line 3 Primary Column Secondary Column
Line 4 Primary Column Secondary Column
Line 5 Primary Column Secondary Column
Line 6 Primary Column Secondary Column
Line 7 Primary Column Secondary Column
Line 8 Primary Column Secondary Column As an alternative, if the Line Number feature is ON, the ADSI HTML page should contain the hyperlink feature so that the Line Number can be sent back to the server. The following is an example of an HTML page that models an ADSI screen that enables a user of the screen phone to send back a Line Number:

<a href='t1" /a>Line 1 Primary Column Secondary Column
<a href='t2" /a>Line 2 Primary Column Secondary Column
<a href='t3" /a>Line 3 Primary Column Secondary Column
<a href='t4" /a>Line 4 Primary Column Secondary Column
<a href='t5" /a>Line 5 Primary Column Secondary Column
<a href='t6" /a>Line 6 Primary Column Secondary Column
<a href='t7" /a>Line 7 Primary Column Secondary Column
<a href='t8" /a>Line 8 Primary Column Secondary Column When the user selects a line (e.g., by clicking on it with a pointing device), a corresponding one of the values "t1" through "t8" will be sent back to the web interface 207 and converted into a corresponding line number that is passed on to the server logic means 205. The server logic means 205 will generate a next screen on the basis of this information. The next screen is adapted by the web interface 207 into an HTML page, and the HTML page is sent back to the web browser 211.

Keypad

To simulate the keypad, an ADSI HTML page should contain the following section:
Enter Selection
<input type="text" name="keypad" value=" "size=2 maxlength=2>

Input Formats

The ADSI protocol also defines user input formats for information entered by the user. To be compatible with web browsers 211, the following section should be included in an ADSI HTML page:
<input type="text" name="u0" size=36 maxlength=36>

The "size" and "maxlength" of the user input depend on the number of "*" characters that are included in an ADSI user input format. (This, of course, is application dependent.) For example, if there are 36 "*" characters, then the "size" and "maxlength" fields should be set to "36" as illustrated.

Figure 4:
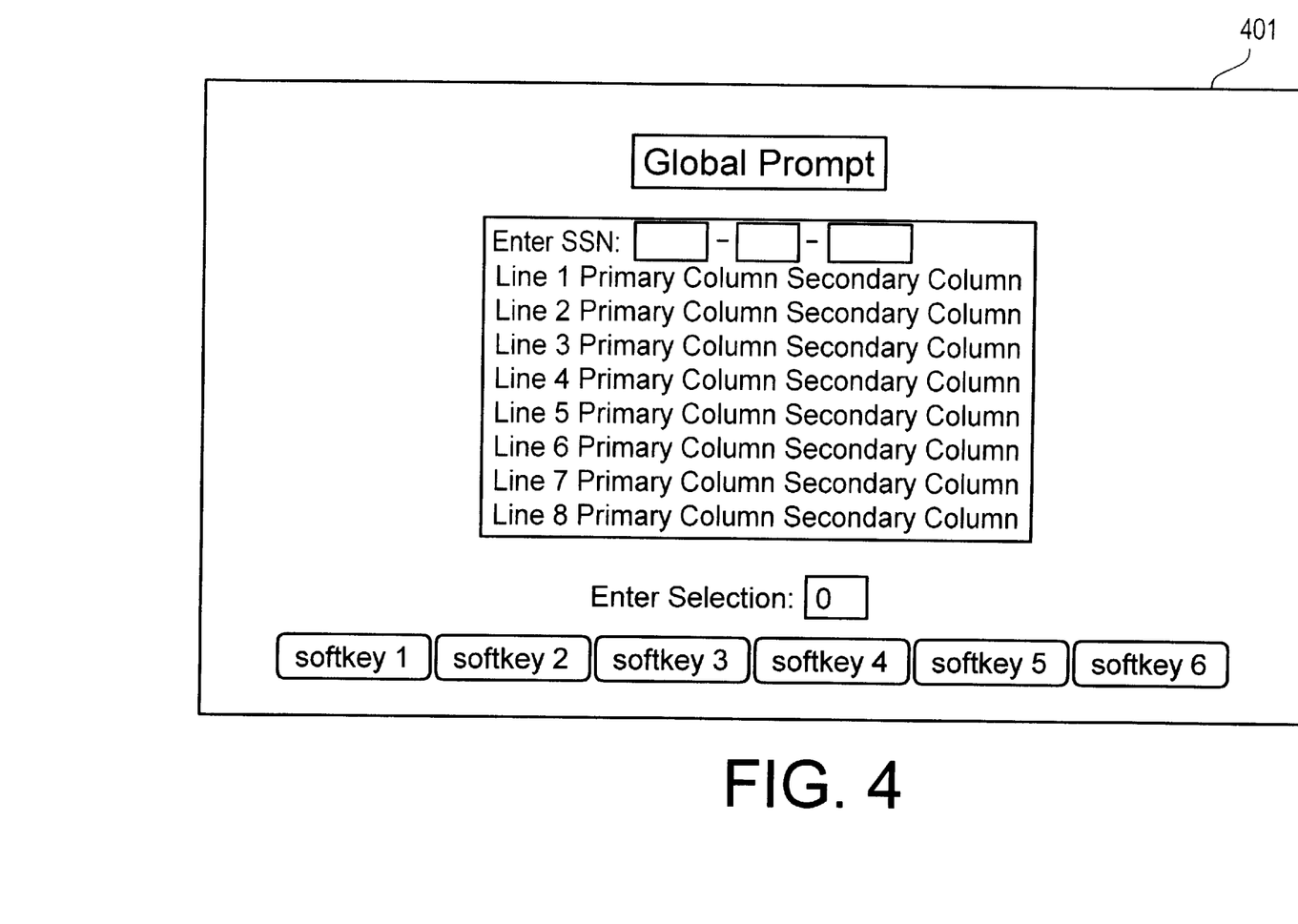
FIG. 4 illustrates and exemplary web page in accordance with one aspect of the invention.

The following is an example of a complete ADSI HTML page which, among other things, prompts a user to enter a social security number (SSN). The resulting HTML page, as it would be displayed on a computer video screen 401, is illustrated in FIG. 4.

<html>
<head>
<! Global Prompt title>
<title>
Global Prompt
</title>
</head>
<body>
<center>
<! Make the display size of the Global Prompt bigger>
<table border>
<td>
<font color=#0000bb>
<h2>Global Prompt
</table>
</font>
<font color=#000000>
</center>
<form action="no_action" method=post>
<! Collect Channel Information>
<input type="hidden" name="hidden$_{13}$ chan" value="1">
<! Collect State Information>
<input type="hidden" name"hidden_state" value="1">
<b>
<center>
<table border>
<td>
<! Collect User Input>
<h3>
Enter SSN
<input type="text" name="u0" size=3 maxlength=3>
<input type="text" name="u1" size=2 maxlength=2>
<input type="text" name="u2" size=3 maxlength=2>
<! Information Screen>
<br>
Line 1 Primary Column Secondary Column
<br>
Line 2 Primary Column Secondary Column
<br>
Line 3 Primary Column Secondary Column
<br>
Line 4 Primary Column Secondary Column
<br>
Line 5 Primary Column Secondary Column
<br>
Line 6 Primary Column Secondary Column
<br>
Line 7 Primary Column Secondary Column
<br>
Line 8 Primary Column Secondary Column
<br>
</table>
</font>
<br>
<! Simulate Keypad Input>
Enter Selection
<input type="text" name="keypad" value="O"size=2 maxlength=2>
<br>
<! Up to 6 Softkeys can be displayed>
<input type="submit" name="sk1" value="softkey1">
<input type="submit" name="sk2" value="softkey2">
<input type="submit" name="sk3" value="softkey3">
<input type="submit" name="sk4" value="softkey4">
<input type="submit" name="sk5" value="softkey5">
<input type="submit" name="sk6" value="softkey6">
</form>
</body>
</html>

The invention has been described with reference to a particular embodiment. However, it will be readily apparent to those skilled in the art that it is possible to embody the invention in specific forms other than those of the preferred embodiment described above. This may be done without departing from the spirit of the invention. For example, the illustrated embodiments are adapted for making ADSI-compatible services available to a web browser whose pages are built with HTML. However, it will be readily apparent that the invention may be adapted for use with servers that are designed to comply with protocols other than ADSI, and for use with web pages that are built with other languages.

In other alternative embodiments, the web server 203 and automated server 205 need not be separately running processes, but may instead be designed as a unitary application program that performs the functions of both the web server and automated server as described herein.

In still other alternative embodiments, the web interface 207 need not be collocated in the same processor as the server logic means 205, but may instead be disposed at any point in the communications link between a user of a web browser 211 and the server logic means 205, including location in a portion of the web browser 211 itself.

Thus, the preferred embodiment is merely illustrative and should not be considered restrictive in any way. The scope of the invention is given by the appended claims, rather than the preceding description, and all variations and equivalents which fall within the range of the claims are intended to be embraced therein.

What is claimed is:

1. An automated server apparatus, comprising:
    server logic means for exchanging data in accordance with a first predefined protocol;
    telephone interface means for effecting the exchange of data between the server logic means and an expanded capability telephone that communicates in accordance with the first predefined protocol; and
    computer network interface means for effecting the exchange of data between the server logic means and a terminal coupled to the computer network, wherein information is transmitted on the computer network in accordance with a second predefined protocol that is different from the first predefined protocol.

2. The automated server of claim 1, wherein the second predefined protocol is a web browser protocol.

3. The automated server of claim 2, wherein the first predefined protocol is an analog display services interface.

4. The automated server of claim 2, wherein the web browser protocol is an HTTP protocol.

5. The automated server of claim 1, wherein the computer network interface means comprises:
    means for modelling features of the expanded capability telephone that are not supported by the terminal.

6. The automated server of claim 1, wherein the first predefined protocol is an analog display services interface.

7. The automated server apparatus of claim 1, wherein data exchanged with the server logic means includes information identifying an origin or a destination of the data.

8. The automated server apparatus of claim 1, wherein the computer network is external to the computer network interface means.

9. A method for enabling communication between server logic means, and an expanded capability telephone and a computer terminal in a computer network, the method comprising the steps of:
    exchanging information data in accordance with a first predefined protocol using the server logic means;
    effecting the exchange of data between the server logic means and the expanded capability telephone that communicates in accordance with the first predefined protocol using a telephone interface means; and
    effecting the exchange of data between the server logic means and a terminal coupled to the computer network using a computer network interface means, wherein information is transmitted on the computer network in accordance with a second predefined protocol that is different from the first predefined protocol.

10. The method of claim 9, wherein the second predefined protocol is a web browser protocol.

11. The method of claim 10, wherein the first predefined protocol is an analog display services interface.

12. The method of claim 10, wherein the web browser protocol is an HTTP protocol.

13. The method of claim 9, further comprising modeling features of the expanded capability telephone that are not supported by the terminal using the computer network interface means.

14. The method of claim 9, wherein the first predefined protocol is an analog display services interface.

15. The method of claim 9, wherein data exchanged with the server logic means includes information identifying an origin or a destination of the data.

16. The method of claim 9, wherein the computer network is external to the computer network interface means.

* * * * *